US010743389B2

United States Patent
Rajagopalan et al.

(10) Patent No.: US 10,743,389 B2
(45) Date of Patent: Aug. 11, 2020

(54) DEPTH QUEUE BY THERMAL SENSING

(71) Applicant: SIGNIFY HOLDING B.V., Eindhoven (NL)

(72) Inventors: Ruben Rajagopalan, Neuss (DE); Harry Broers, 'S-Hertogenbosch (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/338,089

(22) PCT Filed: Sep. 18, 2017

(86) PCT No.: PCT/EP2017/073445
§ 371 (c)(1),
(2) Date: Mar. 29, 2019

(87) PCT Pub. No.: WO2018/059985
PCT Pub. Date: Apr. 5, 2018

(65) Prior Publication Data
US 2020/0037417 A1 Jan. 30, 2020

(30) Foreign Application Priority Data
Sep. 29, 2016 (EP) .................................... 16191259

(51) Int. Cl.
*G01B 11/00* (2006.01)
*G01J 5/10* (2006.01)
(Continued)

(52) U.S. Cl.
CPC .......... *H05B 47/105* (2020.01); *G01B 11/00* (2013.01); *G01J 5/10* (2013.01); *H05B 47/19* (2020.01); *G01J 2005/0077* (2013.01)

(58) Field of Classification Search
None
See application file for complete search history.

(56) References Cited

U.S. PATENT DOCUMENTS 5,654,977 A * 8/1997 Morris .................. G01N 25/72
374/124
6,069,696 A * 5/2000 McQueen .......... G01G 19/4144
235/383

(Continued)

FOREIGN PATENT DOCUMENTS

| EP | 2819489 A2 | 12/2014 |
| WO | 9746856 A1 | 12/1997 |

(Continued)

OTHER PUBLICATIONS

Tayfun Aytac et al., "Recognizing Targets From Infrared Intensity Scan Patterns Using Artificial Neural Networks," Optical Engineering 48(1), Jan. 2009 (13 Pages).

*Primary Examiner* — Dedei K Hammond
(74) *Attorney, Agent, or Firm* — Meenakshy Chakravorty

(57) ABSTRACT

A method (300) for characterizing a lighting environment using thermal imaging includes the steps of: providing (310) a lighting unit (10) comprising a light source (12), a thermal imager (32), and a controller (22); obtaining (330), using the thermal imager, one or more thermal images of one or more surfaces (52) within the lighting environment; extracting (340), by the controller using the one or more thermal images, a thermal shadow (54) on one or more surfaces within the lighting environment; determining (360), from the thermal shadow, a depth queue for an object (52) associated with the thermal shadow; and characterizing (370), by the controller using the determined depth queue, the object.

9 Claims, 6 Drawing Sheets

(51) Int. Cl.
*H05B 47/105* (2020.01)
*H05B 47/19* (2020.01)
*G01J 5/00* (2006.01)

(56) References Cited

U.S. PATENT DOCUMENTS

| | | | |
|---|---|---|---|
| 8,103,384 | B2 | 1/2012 | Matsumoto et al. |
| 8,818,079 | B2 | 8/2014 | Phan et al. |
| 9,380,224 | B2 | 6/2016 | Keskin et al. |
| 2014/0374602 | A1* | 12/2014 | Falcone ............ H01L 27/146 250/341.1 |
| 2015/0103141 | A1 | 4/2015 | Lee et al. |

FOREIGN PATENT DOCUMENTS

| | | |
|---|---|---|
| WO | 2010131212 A1 | 11/2010 |
| WO | 2016037772 A1 | 3/2016 |

\* cited by examiner

DEPTH QUEUE BY THERMAL SENSING

CROSS-REFERENCE TO PRIOR APPLICATIONS

This application is the U.S. National Phase application under 35 U.S.C. § 371 of International Application No. PCT/EP2017/073445, filed on Sep. 18, 2017, which claims the benefit of European Patent Application No. 16191259.7, filed on Sep. 29, 2016. These applications are hereby incorporated by reference herein.

FIELD OF THE INVENTION

The present disclosure is directed generally to methods and systems for lighting units with integrated thermal imaging configured to acquire one or more depth queues from extracted thermal shadows.

BACKGROUND

Sensor-driven lighting units monitor a characteristic of the environment with a sensor and utilize the sensor data to control the light source of the lighting unit, or to reveal other information about the environment. The most common example of sensor-driven lighting units are systems that monitor light levels using integrated photocells that measure ambient light level. For example, night lights use ambient light to turn on when ambient light levels decrease and to turn off when ambient light levels increase. As another example, some sensor-driven luminaries measure reflected light coming from a surface below and dim the light output when the light level exceeds a predefined light level. Since these luminaires integrate all the reflected light into a single light level, there can be incorrect measurements such as in the case of striped patterns casted by blinds or shadows casted by trees. Accordingly, these solutions often provide sub-optimal light level monitoring, thereby resulting in an overall poor system performance. Further, these systems are unable to determine or extract depth queue information about objects within the lighting environment.

Another common example of sensor-driven lighting units are systems that monitor the occupancy state of a room. These luminaires use a variety of mechanisms, including ambient light levels, motion detection, and thermal imaging to detect a presence in a room and control the luminaire accordingly. For example, in an office setting, objects with a thermal signature such as people are detected by a thermal imager and thus informs the lighting system that a person is present. These thermal imaging luminaires function largely to detect the presence of an individual in a room. However, there is other information that can be extracted from the thermal imaging to maximize the efficiency and functionality of the lighting system.

Accordingly, there is a continued need in the art for methods and lighting systems that utilize a lighting unit with a thermal imager to extract information about a lighting environment, and more specifically to acquire one or more depth queues from extracted thermal shadows within the lighting environment.

SUMMARY OF THE INVENTION

The present disclosure is directed to inventive methods and apparatus for characterizing a portion of a lighting environment using thermal imaging. Various embodiments and implementations herein are directed to a lighting unit with a thermal imager. The thermal images are analyzed to extract thermal shadows within the environment. The extracted thermal shadows are then analyzed to create one or more depth queues. The depth queues can then be utilized to characterize the lighting environment, such as determining the orientation of a light source, the height of an object, and/or the position or orientation of an object, among other uses.

Generally, in one aspect, a method for determining a depth queue for an object using thermal imaging is provided. The method comprises the steps of: (i) obtaining, using a thermal imager, one or more thermal images of one or more surfaces within an environment; (ii) extracting, by the controller using the one or more thermal images, a thermal signature on one or more surfaces within the environment; (iii) determining, from the thermal signature, a depth queue for the object; and (iv) characterizing, by the controller using the determined depth queue, the object.

According to an embodiment, the thermal signature results from a shadow cast by an object within the lighting environment.

According to an embodiment, the thermal signature results from heat generated by an object within the environment.

According to an embodiment, the step of extracting a thermal signature comprises comparing a thermal image at a first time point to a thermal image at a second time point.

According to another aspect a method for characterizing a lighting environment using thermal imaging is provided. The method includes the steps of: (i) providing a lighting unit comprising a light source, a thermal imager, and a controller; (ii) obtaining, using the thermal imager, one or more thermal images of one or more surfaces within the lighting environment; (iii) extracting, by the controller using the one or more thermal images, a thermal signature on one or more surfaces within the lighting environment; (iv) determining, from the thermal signature, a depth queue for an object associated with the thermal shadow; and (v) characterizing, by the controller using the determined depth queue, the object.

According to an embodiment, the method further includes the step of communicating, using a communications module of the lighting unit, the extracted thermal signature or the determined depth queue.

According to an embodiment, the step of extracting a thermal signature comprises comparing a thermal image at a first time point to a thermal image at a second time point.

According to an embodiment, the step of characterizing the object comprises identifying the object, determining a height of the object, determining an orientation of the object, and/or localizing the object within the lighting environment, among other things. According to an embodiment, the object comprises furniture within the lighting environment.

According to an aspect, a lighting unit configured to characterize a lighting environment using thermal imaging is provided. The lighting unit includes: a light source; a thermal imager configured to obtain one or more thermal images of one or more surfaces within the lighting environment; and a controller configured to: (i) extract, using the one or more thermal images, a thermal shadow on one or more surfaces within the lighting environment; (ii) determine, from the thermal shadow, a depth queue for an object associated with the thermal shadow; and (iii) characterize the object using the determined depth queue.

According to an aspect, a system configured to characterize a lighting environment using thermal imaging is provided. The system includes: a plurality of lighting units each comprising a light source, a thermal imager configured to obtain one or more thermal images of one or more surfaces within the lighting environment, and a communications module configured to communicate the one or more thermal images; and a controller configured to: (i) receive, from one or more of the communications modules, the one or more thermal images; (ii) extract, using the one or more thermal images, a thermal shadow on one or more surfaces within the lighting environment; (iii) determine, from the thermal shadow, a depth queue for an object associated with the thermal shadow; and (iv) characterize the object using the determined depth queue.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radio luminescent sources, and luminescent polymers.

A given light source may be configured to generate electromagnetic radiation within the visible spectrum, outside the visible spectrum, or a combination of both. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a lighting unit configured to monitor a lighting environment. More generally, Applicant has recognized and appreciated that it would be beneficial to provide a lighting unit, fixture, or system that obtains thermal images of the lighting environment. A particular goal of utilization of certain embodiments of the present disclosure is to characterize the lighting environment using thermal imaging information.

In view of the foregoing, various embodiments and implementations are directed to a lighting unit or system with a thermal imager that obtains thermal images of the lighting environment. A processor of the lighting unit or system extracts thermal signatures from within the lighting environment. The thermal signatures are utilized to determine one or more depth queues about one or more objects or light sources within the lighting environment. The determined depth queues can then be utilized to characterize the lighting environment, such as determining the orientation of a light source, the height of an object, and/or the position or orientation of an object, among other parameters of the lighting environment.

Figure 1:
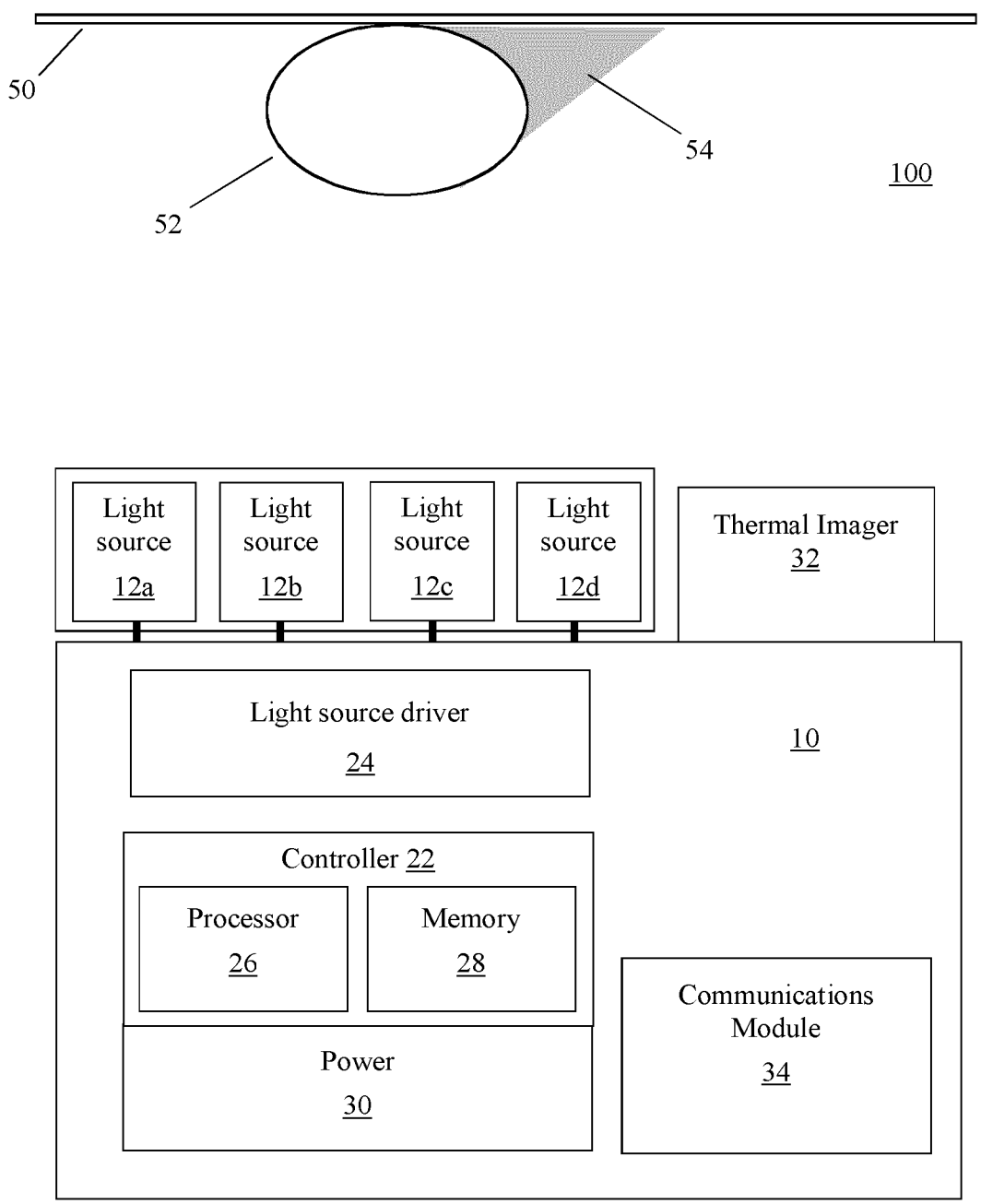
FIG. 1 is a schematic representation of a lighting unit, in accordance with an embodiment.

Referring to FIG. 1, in one embodiment, a lighting unit 10 is provided that includes one or more light sources 12, where one or more of the light sources may be an incandescent light source, a halogen light source, and/or a LED-based light source. The light source can be driven to emit light of predetermined character (i.e., color intensity, color temperature) by one or more light source drivers 24. Many different numbers and various types of light sources (all LED-based light sources, LED-based and non-LED-based light sources alone or in combination, etc.) adapted to generate radiation of a variety of different colors may be employed in the lighting unit 10. According to an embodiment, lighting unit 10 can be any type of lighting fixture, including but not limited to a night light, a street light, a table lamp, or any other interior or exterior lighting fixture. According to an embodiment, lighting unit 10 is configured to illuminate all or a portion of a target surface 50 and/or an object 52 within the lighting environment. According to an embodiment, object 52 casts a thermal shadow 54, in which the area within thermal shadow 54 is cooler than the area outside thermal shadow 54. Thermal shadow 54 may be created by lighting unit 10, and/or by another light source such as the sun or any other light source. According to another embodiment, thermal shadow 54 may be generated by an electronic device other than a light source. For example, devices such as monitors, heaters, and other devices, including those that are commonly found in homes and/or offices, can create a thermal shadow. Accordingly, a thermal shadow as described or otherwise envisioned herein can result from a light source, the sun, a person, an electronic device, or anything else capable of generating or directing heat.

According to an embodiment, lighting unit 10 includes a controller 22 that is configured or programmed to output one or more signals to drive the one or more light sources 12a-d and generate varying intensities, directions, and/or colors of light from the light sources. For example, controller 22 may be programmed or configured to generate a control signal for each light source to independently control the intensity and/or color of light generated by each light source, to control groups of light sources, or to control all light sources together. According to another aspect, the controller 22 may control other dedicated circuitry such as light source driver 24 which in turn controls the light sources so as to vary their intensities. Controller 22 can be or have, for example, a processor 26 programmed using software to perform various functions discussed herein, and can be utilized in combination with a memory 28. Memory 28 can store data, including one or more lighting commands or software programs for execution by processor 26, as well as various types of data including but not limited to specific identifiers for that lighting unit. For example, the memory 28 may be a non-transitory computer readable storage medium that includes a set of instructions that are executable by processor 26, and which cause the system to execute one or more of the steps of the methods described herein.

Controller 22 can be programmed, structured and/or configured to cause light source driver 24 to regulate the intensity and/or color temperature of light source 12 based on predetermined data, such as ambient light conditions, among others, as will be explained in greater detail hereinafter. According to one embodiment, controller 22 can also be programmed, structured and/or configured to cause light source driver 24 to regulate the intensity and/or color temperature of light source 12 based on communications received by a wireless communications module 34.

Lighting unit 10 also includes a source of power 30, most typically AC power, although other power sources are possible including DC power sources, solar-based power sources, or mechanical-based power sources, among others. The power source may be in operable communication with a power source converter that converts power received from an external power source to a form that is usable by the lighting unit. In order to provide power to the various components of lighting unit 10, it can also include an AC/DC converter (e.g., rectifying circuit) that receives AC power from an external AC power source 30 and converts it into direct current for purposes of powering the light unit's components. Additionally, lighting unit 10 can include an energy storage device, such as a rechargeable battery or capacitor, that is recharged via a connection to the AC/DC converter and can provide power to controller 22 and light source driver 24 when the circuit to AC power source 30 is opened.

In addition, lighting unit 10 includes a thermal imager 32 which is connected to an input of controller 22 and collects thermal images in or from the vicinity of lighting unit 10 and can transmit data to controller 22, or externally via wireless communications module 34, that is representative of the thermal images it collects. In some embodiments such as system 200 depicted in FIG. 2, thermal imager 32 is remote from the lighting unit 10 and transmits obtained thermal imaging data to wireless communications module 34 of the lighting unit. The wireless communications module 34 can be, for example, Wi-Fi, Bluetooth, IR, radio, or near field communication that is positioned in communication with controller 22 or, alternatively, controller 22 can be integrated with the wireless communications module.

Figure 2:
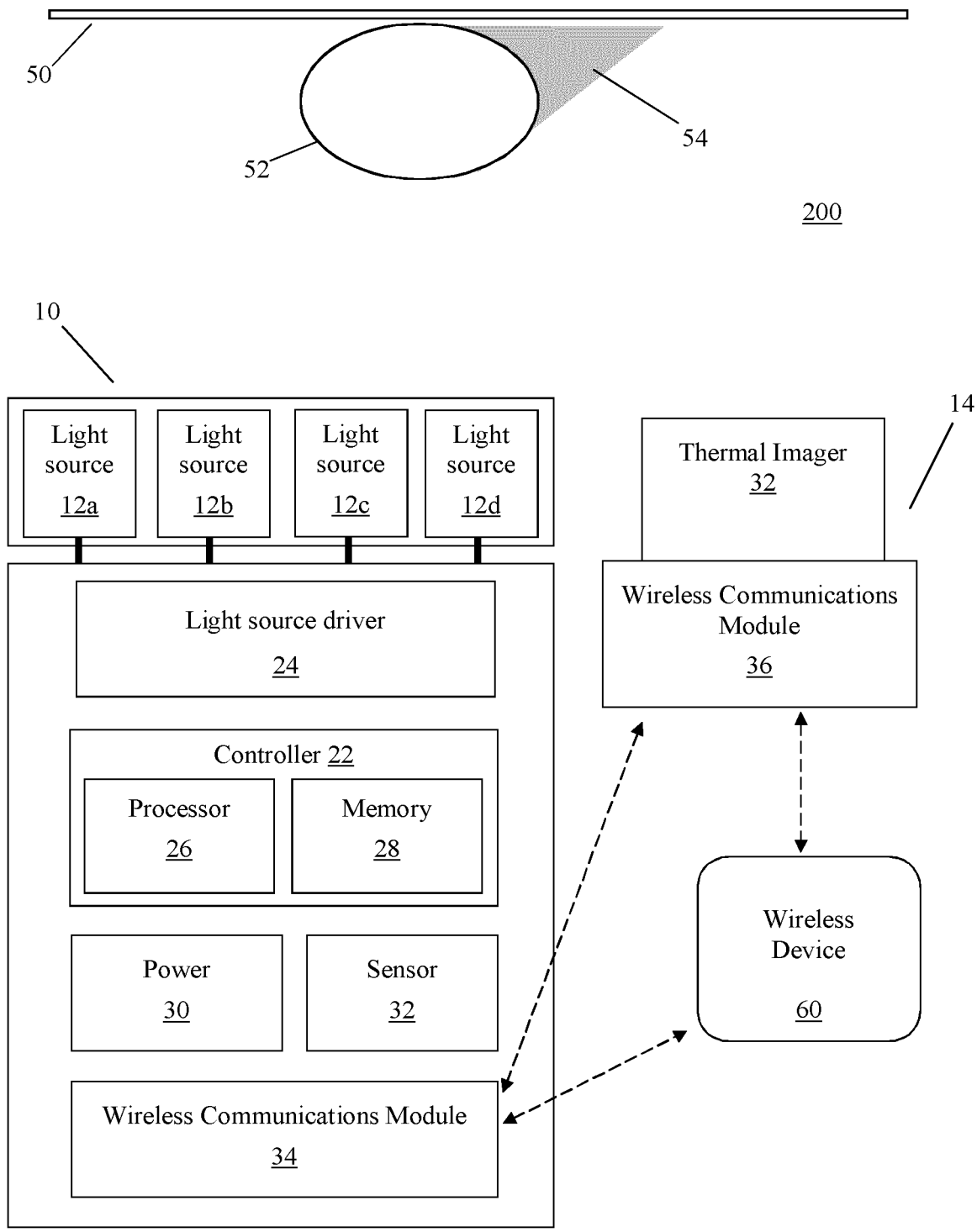
FIG. 2 is a schematic representation of a lighting system, in accordance with an embodiment.

Referring to FIG. 2, in one embodiment, a lighting system 200 is provided that includes a lighting unit 10. Lighting unit 10 can be any of the embodiments described herein or otherwise envisioned, and can include any of the components of the lighting units described in conjunction with FIG. 1, such as one or more light sources 12, light source driver 24, controller 22, and wireless communications module 34, among other elements. Lighting system 200 also includes a thermal imager component 14 which includes a thermal imager 32 and a wireless communications module 36, among other elements. Wireless communications modules 34 and 36 can be, for example, Wi-Fi, Bluetooth, IR, or near field communication that is positioned in communication with each other and/or with a wireless device 60, which can be, for example, a network, a computer, a server, or a handheld computing device, among other wireless devices.

According to an embodiment, either of lighting system 100 or 200 can comprise multiple lighting units 10, each with one or more light sources 12. For example, lighting system 100 or 200 can be an entire office building, a floor of a building, a suite of rooms, a complex of buildings, or any other configuration comprise multiple lighting units. These multiple lighting units can be configured to communicate with each other and/or with a central computer, server, or other central hub. One or more aspects of the functionality of the methods and systems described or otherwise envisioned herein may occur within the central hub rather than within the individual lighting units. For example, the central hub may extract information from thermal images captured by one or more lighting units and transmitted or otherwise communicated to the central hub.

Figure 3:
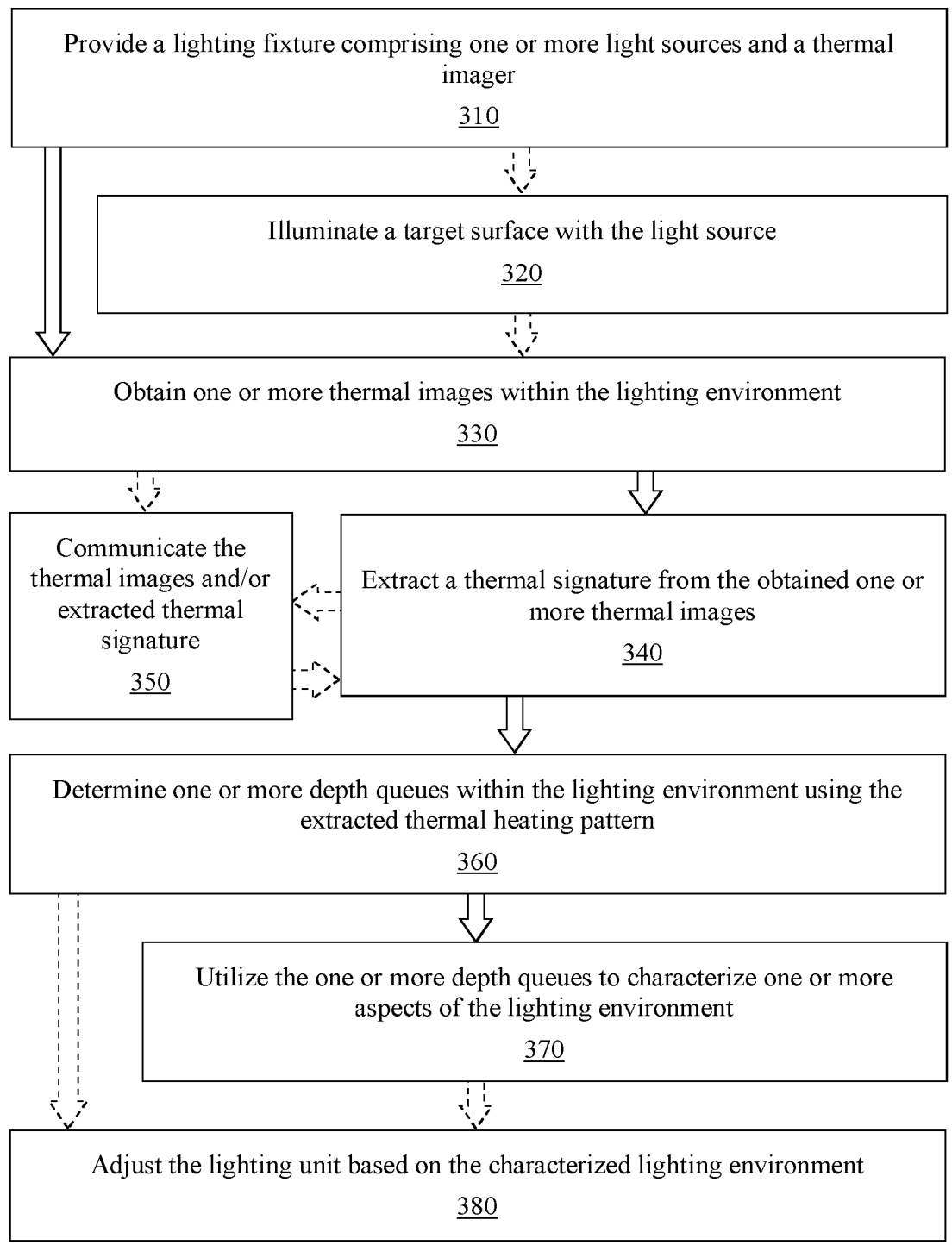
FIG. 3 is a flow chart of a method for characterizing a lighting environment using depth queues extracted from thermal shadows, in accordance with an embodiment.

Referring to FIG. 3, in one embodiment, a flow chart illustrating a method 300 for using thermal imaging to extract information about a lighting environment. At step 310 of the method, a lighting unit 10 and/or lighting system 100 or 200 is provided. Lighting unit 10 and/or lighting system 100 or 200 can be any of the embodiments described herein or otherwise envisioned, and can include any of the components of the lighting units described in conjunction with FIGS. 1 and 2, such as one or more light sources 12, light source driver 24, controller 22, thermal imager 32, and wireless communications module 34, among other elements. According to an embodiment, lighting unit 10 is configured to illuminate all or a portion of a target surface 50 containing one or more objects 52. According to an embodiment, one or more of the objects 52 casts a thermal shadow 54, in which the area within thermal shadow 54 is cooler than the area outside thermal shadow 54. Thermal shadow 54 may be created by lighting unit 10, and/or by another light source such as the sun or any other light source.

At optional step 320 of the method, the lighting unit illuminates all or a portion of the target surface 50. According to one embodiment, the lighting unit is an indoor lighting fixture and is configured to illuminate a target surface such as a room or hallway. The lighting unit may automatically illuminate the lighting environment during a predetermined period, or may be activated and deactivated by users. The lighting unit may be configured to respond to occupancy, thereby deactivating when there are no occupants and activating when occupants are detected. According to another embodiment, the lighting unit can detect ambient light levels and based on a predetermined threshold can activate and deactivate the light sources.

At step 330 of the method, the thermal imager 32 of the lighting unit obtains one or more thermal images of one or more locations within the target surface 50, of the one or more objects 52, and/or one or more other thermal images within the lighting environment. The thermal imager can be, for example, any thermal imager capable of obtaining thermal images of the lighting environment. The thermal imager communicates the thermal images or thermal imaging information to the controller 22, where the information can be analyzed and/or can be stored within memory 28. According to one embodiment, the thermal imager obtains thermal imaging data continuously. According to another embodiment, the thermal imager obtains thermal imaging data periodically, such as one every minute or multiple times per minute, among many other periods of time. According to one embodiment, the thermal imager communicates or controller 22 communicates the thermal images to a central hub for analysis.

According to an embodiment, the thermal information is a thermal signature, which can be either a thermal shadow or a signature resulting from heat generated by an object within the environment. It should be recognized that a "thermal signature" refers to either a thermal shadow or a signature resulting from heat generated by an object within the environment.

According to an embodiment, the thermal shadow(s) in the lighting environment is created by the same source that produces the light for the environment, where the thermal shadow results from a visual shadow created in the environment. According to another embodiment, the thermal shadow(s) in the lighting environment is created by a source other than the light source in the environment. For example, in a LED-lighting environment or a lighting environment lighted by several light sources at multiple angles, there may be few or no visual shadows created. However, a thermal source may cause a thermal shadow that is not visible to the naked eye but is visible with a thermal imager.

According to yet another embodiment, depth cues can be obtained from thermal reflections instead of or in conjunction with thermal shadows. For example, a thermal reflection may be created when a heat signal bounces or reflects off of an object exposed to a heat source, and the heat source lands on a surface, thereby heating the surface and/or creating a thermal shadow. Typically, thermally-passive objects will typically only create thermal shadows by blocking radiated heat from a source such as the sun. Thermally-active objects, such as electronic devices or human bodies, can also create thermal shadows with higher temperature than the surrounding environment because they radiate heat. Certain objects, or materials covering the floor or wall, may reflect that heat signal. This information can also be used to retrieve depth information as described or otherwise envisioned herein.

Figure 4A:
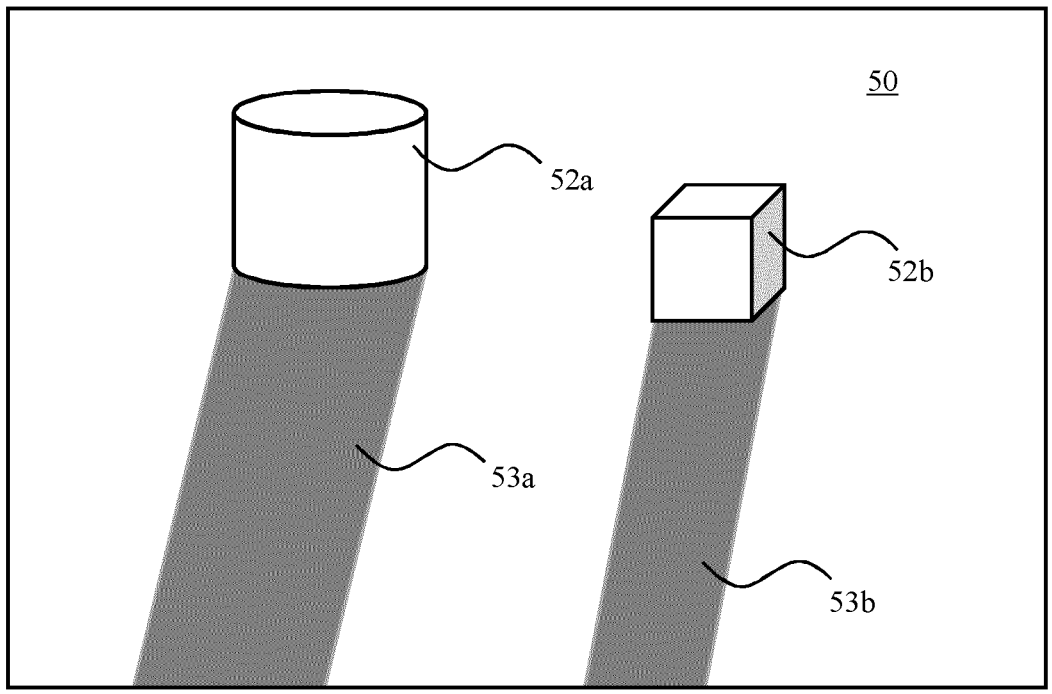
FIG. 4A is a schematic representation of a lighting environment, in accordance with an embodiment.
Figure 4B:
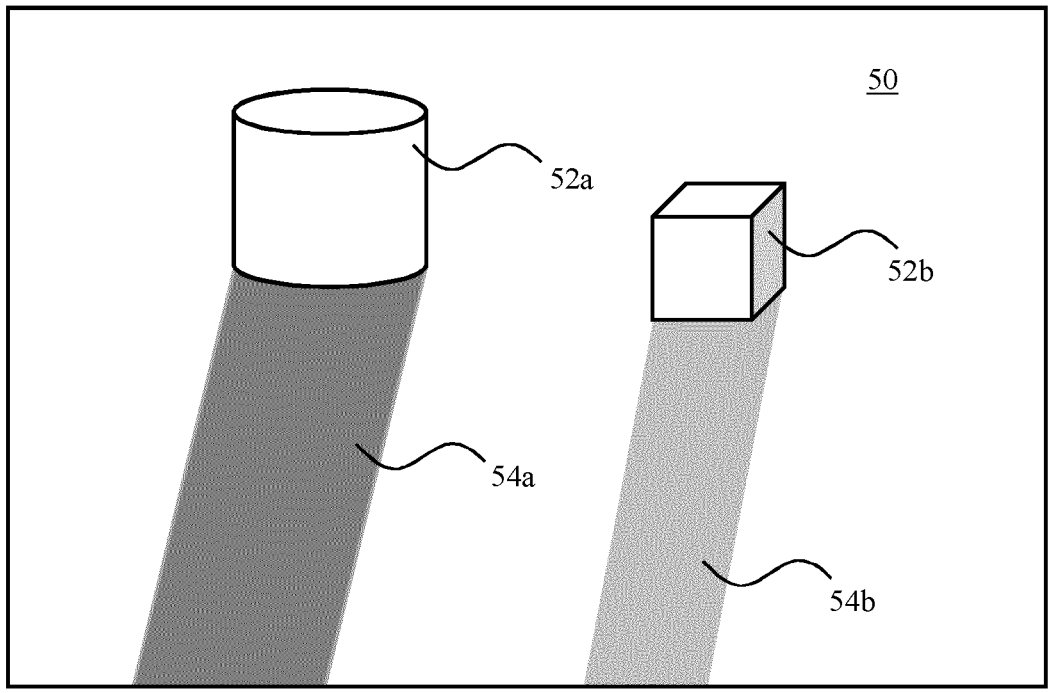
FIG. 4B is a schematic representation of a lighting environment, in accordance with an embodiment.

Referring to FIGS. 4A and 4B, as just one example, is a lighting environment 50 in which the thermal imager 32 of lighting unit 10 can obtain one or more thermal images. FIG. 4A represents a visual image taken of the lighting environment, while FIG. 4B represents a thermal image taken of the lighting environment. Object 52a in lighting environment 50 creates a shadow 53a as a result of a light source (not shown). Shadow 53a results in cooling of the surfaces within that shadow, which creates a thermal shadow 54a shown in FIG. 4B. Similarly, object 52b in lighting environment 50 creates a shadow 53b as a result of a light source (not shown). Shadow 53b results in cooling of the surfaces within that shadow, which creates a thermal shadow 54b shown in FIG. 4B. In this example, object 52a has cast a shadow for longer than object 52b, and thus the thermal shadow 54a is more distinctive than thermal shadow 54b, because the surfaces within shadow 53a are cooler than the surfaces within shadow 53b.

Figure 5A:
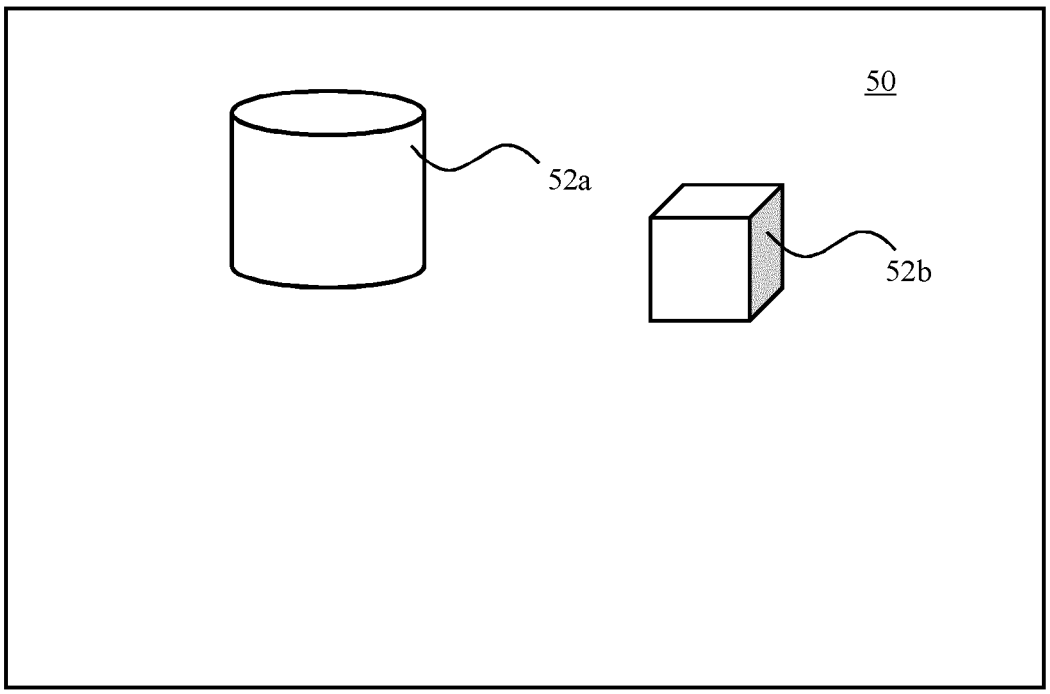
FIG. 5A is a schematic representation of a lighting environment, in accordance with an embodiment.
Figure 5B:
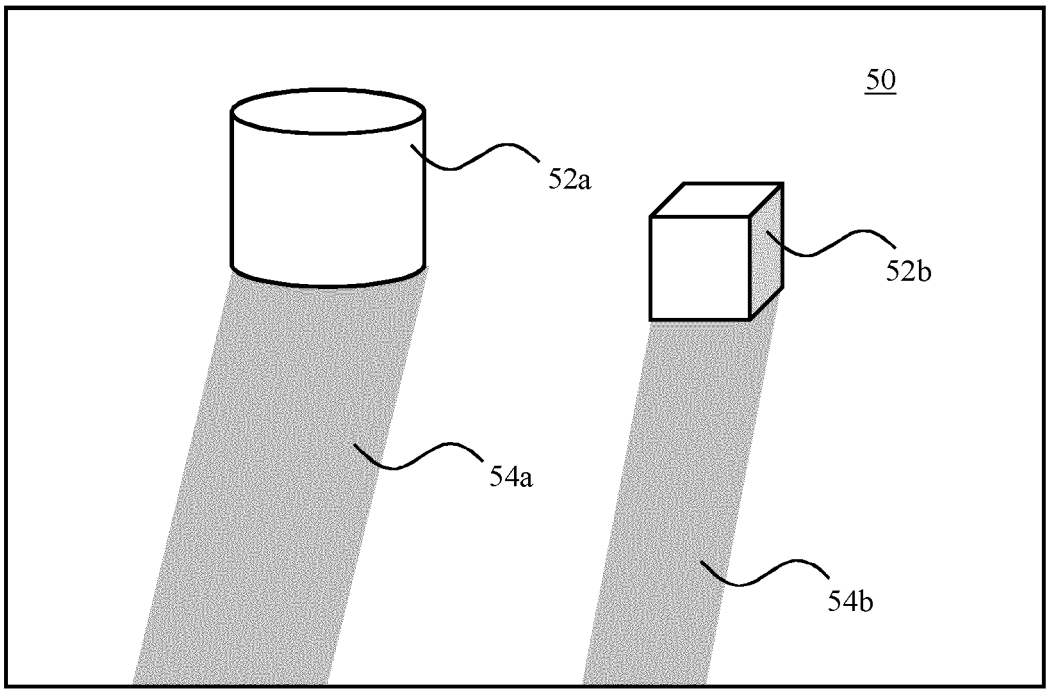
FIG. 5B is a schematic representation of a lighting environment, in accordance with an embodiment.

According to another embodiment, for example, shadows 53 may be much less distinctive than those shown in FIGS. 4A and 4B, especially when LED-based office lighting is utilized, and/or when the object is illuminated from multiple angles. If the object is also illuminated by sunlight or some other source capable of generating a thermal shadow 54, then only this source will be the only source to introduce a thermal shadow despite the presence of the LED-based and/or multi-angle lighting. For example, referring to FIGS. 5A and 5B is a lighting environment 50 in which the thermal imager 32 of lighting unit 10 can obtain one or more thermal images. In this example, both FIGS. 5A and 5B represent a thermal image taken of the lighting environment. In both figures, there is LED-based and/or multi-angle lighting, and thus there is no thermal shadow, or no significant thermal shadow, created. For example, in FIG. 5A there is no sunlight, electronic device, or other source of heat to create a thermal shadow. In FIG. 5B, however, there is a source present in the environment that creates a thermal shadow 54a and 54b for objects 52a and 52b, respectively. The source may be the sun, an electronic device, a person, or anything else capable of generating a thermal shadow. The environments in both FIGS. 5A and 5B are lighted, except in FIG. 5B there is a thermal shadow source that allows for creation of a thermal shadow that can be detected as described or otherwise envisioned herein.

When utilized for tracking individuals within an environment, the effect described in reference to FIGS. 5A and 5B can be utilized because, in the presence of sunlight, an individual will cast a shadow while its own body will be radiate heat. The system can comprise, therefore, an algorithm that utilizes this information by searching hot and cool regions that are next to each other, such as with normal camera images where one can use the body and its shadow to obtain a notion of depth and improve detection robustness by removing object not casting shadows.

Figure 6A:
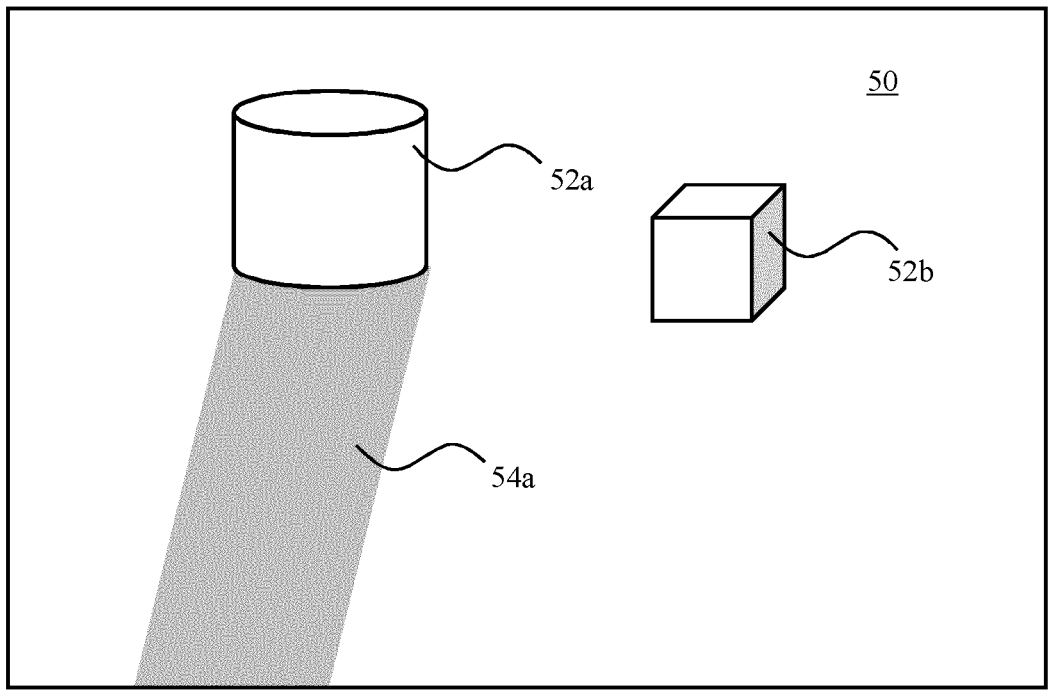
FIG. 6A is a schematic representation of a lighting environment, in accordance with an embodiment.
Figure 6B:
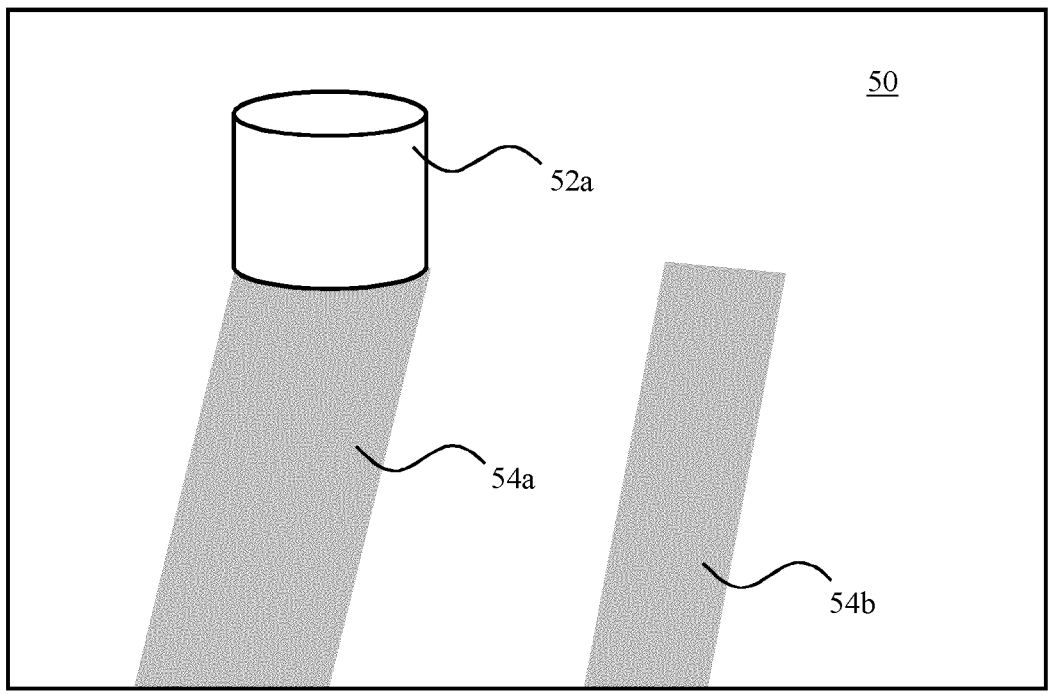
FIG. 6B is a schematic representation of a lighting environment, in accordance with an embodiment.

Thermal shadows are created slower than visual shadows, as the heating process is much slower than the speed of light. The cooling effect indirectly also gives an indication of stationary or mobile objects. For example, referring to FIGS. 6A and 6B is a lighting environment 50 in which the thermal imager 32 of lighting unit 10 can obtain one or more thermal images. In this example, both FIGS. 6A and 6B represent a thermal image taken of the lighting environment. In both figures, there is a source that results in the creation of a thermal shadow 54. In FIG. 6A, objects 52a and 52b are in the path of the thermal shadow source, and thus should be creating a thermal shadow 54. Indeed, object 54a is producing a thermal shadow 54a. However, object 52b is not creating a thermal shadow, which suggests that object 52b was recently placed or otherwise localized within that location. The timeframe is recent enough that a thermal shadow has not yet been created. This timeframe may be calculated based on the intensity of the light source, the temperature of the room, and a variety of other factors.

In contrast, in FIG. 5B, there is a thermal shadow 54b that does not have an object associated with it. Accordingly, this suggests that an object 52b (not shown) was recently removed from a location that would produce such a thermal shadow 54b. Although the object is removed, the remaining thermal shadow can provide information about that object, including shape and/or other characteristics. The timeframe of removal is recent enough that a thermal shadow remains despite exposure to the heat source. This timeframe may be calculated based on the intensity of the light source, the temperature of the room, and a variety of other factors. At step 340 of the method, a processor such as processor 26 and/or controller 22 analyzes the thermal imaging data and extracts one or more thermal shadows 54 from the one or more thermal images. The thermal shadow 54 can be obtained from the thermal images using a variety of different mechanisms. According to an embodiment, a thermal image obtained at a single time point is analyzed, such as by detecting intensity or motion gradients within the image. One or more pixels in a first portion of the image are compared to one or more pixels in a different, second portion of the image, which may or may not be neighboring portions, and differences in thermal intensity or temperature may indicate the existence of a thermal shadow.

According to another embodiment, thermal images obtained at two different time points, T1 and T2, are compared to each other to obtain thermal differences between the images obtained at T1 and T2. The difference can be the appearance of a thermal shadow, the disappearance of a thermal shadow, or an intensity or temperature change of a thermal shadow, such as an increasing or decreasing of the temperature of the shadow. Other changes are possible.

At optional step 350 of the method, the thermal images and/or extracted thermal shadows are communicated from the lighting unit 10 to another lighting unit 10, to a component of a lighting system 100 or 200, and/or to a central hub, computer, server, or processor. The lighting unit 10 may be in direct and/or networked wired and/or wireless communication with the other lighting unit 10, the component of a lighting system 100 or 200, and/or the central hub, computer, server, or processor. Accordingly, the other lighting unit 10, the component of a lighting system 100 or 200, and/or the central hub, computer, server, or processor may be located nearby or remote from the lighting unit 10.

At step 360 of the method, the extracted thermal shadows are utilized to characterize the lighting environment and/or one or more objects within the lighting environment. The extracted thermal shadows are analyzed by a processor comprising one or more extraction algorithms to identify one or more depth queues. For example, a depth queue may comprise information about how planar an object may be, such as how flat or spherical the object or a portion of an object may be.

At step 370 of the method, the one or more depth queues are utilized to characterize one or more aspects of the lighting environment. For example, according to one embodiment, the one or more depth queues can be utilized to segment the lighting environment into areas at floor level and areas above floor level. The lighting unit can provide this segmentation information to the lighting unit controller, or to a controller of a lighting system. According to another embodiment as described in reference to FIGS. 5A through 6B, for example, the one or more depth queues can be utilized to determine that an object or person has recently entered or been removed from a location. Additionally, entrances and removal, as well as movement tracking, can be detected based on differences in casted shadows on the ground and on walls, among other possibilities.

According to another embodiment, the one or more depth queues can be utilized, together with position information of the sun or other light source, to determine or estimate the orientation of the surface from the shape or angle of the thermal shadow. For example, the system may know the direction of the light entering the room, where the light is responsible for creating the detected thermal shadows. Position information about the sun, for example, could be derived using the angle and position of the sun along the ecliptic as determined from date and time calculators, and this information could be obtained with the thermal shadow and/or depth queues to determine the orientation of an object making the shadow. The lighting unit can provide this orientation information to the lighting unit controller, or to a controller of a lighting system. For example, for windows containing blinds, the thermal shadows and/or thermal shadow pattern created by the blinds could be utilizes alone or in combination with position information about the light source or sun to determine the position of the blinds.

According to another embodiment, the one or more depth queues can be utilized, together with position information of the sun or other light source, to determine or estimate the height of an object making the thermal shadow. For example, the system may know the direction of the light entering the room, where the light is responsible for creating the detected thermal shadows. Position information about the sun, for example, could be derived using the angle and position of the sun along the ecliptic as determined from date and time calculators, and this information could be obtained with the thermal shadow and/or depth queues to determine the height of an object making the shadow. The lighting unit can provide this orientation information to the lighting unit controller, or to a controller of a lighting system.

According to another embodiment, the one or more depth queues can be utilized to identify one or more objects within the lighting environment. For example, the depth queues can be utilized by the system to identify and/or localize furniture such as desks, tables, couches, or other furniture within the lighting environment, thereby allowing for the evaluation of space layout and usage. The system may even be able to determine that a certain type, make, and/or shape of furniture is present in the lighting environment. Alternatively or in addition, the system may have a selection of possible furniture or object types from which to choose. As another option, the space may be pre-defined, mapped, or characterized within the system, and the extracted depth queues may be compared to the pre-defined map in order to determine that an object has been introduced, moved, or removed within the lighting environment. Indeed, even three-dimensional shape information can be retrieved by using shape from silhouette techniques, and/or using the sun or another moving light source together with changes in casted thermal shadows. Many other methods of shape determination are possible.

According to another embodiment, the one or more depth queues can be utilized to detect one or more individuals within a room. Additionally, the location of the individual and the resulting thermal shadows and depth queues may be utilized to model or otherwise characterize the room. For example, the thermal shadows and depth queues can be analyzed to determine the amount of interaction between one or more individuals and one or more surfaces, within the lighting environment. The system may determine from thermal shadows and depth queues over the course of a day or other time period, for example, that one or more individuals have entered the space x number of times and have spent a total of y minutes within the space during the workday between the hours of 9 AM and 5 PM. The system may determine from thermal shadows and depth queues, for example, that a room has not be used in several days. The system may also determine from thermal shadows and depth queues that a particular item within the room is utilized regularly, such as a computer, desk, or chair. Many other utilizations of the thermal shadows and depth queues are possible.

At optional step 380 of the method, the lighting unit 10 utilizes the thermal shadows and/or depth queues, or the characterization of the lighting environment based on those thermal shadows and depth queues, to adjust or otherwise adapt the light profile emitted by the lighting unit or system. According to an embodiment, the controller can adjust the beam width, angle, and/or intensity of one or more light sources. The information could also be utilized to control the sensitivity and/or performance of one or more other sensors in order to reduce the effect of false triggers, such as activation and/or inactivation of a light source. Similarly, the information could be utilized to change a feature, parameter, or characteristic of the lighting environment over which the system has control.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method for determining a depth queue for an object using thermal imaging, the method comprising the steps of:
   obtaining, using a thermal imager, one or more thermal images of one or more surfaces within an environment;
   extracting, by a controller using the one or more thermal images, a thermal signature on one or more surfaces within the environment, wherein the thermal signature results from a thermal shadow created by a heat signal reflecting off an object exposed to a heat source;
   determining, from the thermal signature, a depth queue for an object; and
   characterizing, by the controller using the determined depth queue, the object,
   wherein the step of characterizing the object comprises determining a height of the object, determining an orientation of the object, or localizing the object within the lighting environment.

2. The method of claim 1, wherein the step of extracting a thermal signature comprises comparing a thermal image at a first time point to a thermal image at a second time point.

3. A method for characterizing a lighting environment using thermal imaging, the method comprising the steps of:
   providing a lighting unit comprising a light source, a thermal imager, and a controller;
   obtaining, using the thermal imager, one or more thermal images of one or more surfaces within the lighting environment;
   extracting, by a controller using the one or more thermal images, a thermal signature on one or more surfaces within the lighting environment, wherein the thermal signature results from a thermal shadow created by a heat signal reflecting off an object exposed to a heat source;
   determining, from the thermal signature, a depth queue for an object associated with the thermal signature; and
   characterizing, by the controller using the determined depth queue, the object,
   wherein the step of characterizing the object comprises determining a height of the object, determining an orientation of the object, or localizing the object within the lighting environment.

4. The method of claim 3, wherein the step of extracting a thermal signature comprises comparing a thermal image at a first time point to a thermal image at a second time point.

5. A lighting unit configured to characterize a lighting environment using thermal imaging, the lighting unit comprising:
   a light source;
   a thermal imager configured to obtain one or more thermal images of one or more surfaces within the lighting environment; and
   a controller configured to: (i) extract, using the one or more thermal images, a thermal shadow on one or more surfaces within the lighting environment, wherein the thermal shadow results from a heat signal reflecting off an object exposed to a heat source; (ii) determine, from the thermal shadow, a depth queue for the object; and (iii) characterize the object using the determined depth queue,
   wherein characterizing the object comprises determining a height of the object, determining an orientation of the object, or localizing the object within the lighting environment.

6. The lighting unit of claim 5, further comprising a communications module configured to communicate the extracted thermal shadow or the determined depth queue.

7. The lighting unit of claim 5, wherein the step of extracting a thermal shadow comprises comparing a thermal image at a first time point to a thermal image at a second time point.

8. A system configured to characterize a lighting environment using thermal imaging, the system comprising:

a plurality of lighting units, each of the plurality of lighting units comprising a light source; a thermal imager configured to obtain one or more thermal images of one or more surfaces within the lighting environment; and a communications module configured to communicate the one or more thermal images; and a controller configured to: (i) receive, from one or more of the communications modules, the one or more thermal images; (ii) extract, using the one or more thermal images, a thermal shadow on one or more surfaces within the lighting environment, wherein the thermal shadow results from a heat signal reflecting off an object exposed to a heat source; (iii) determine, from the thermal shadow, a depth queue for the object; and (iv) characterize the object using the determined depth queue, wherein characterizing the object comprises determining a height of the object, determining an orientation of the object, or localizing the object within the lighting environment.

9. The system of claim 8, wherein extracting a thermal shadow comprises comparing, by the controller, a thermal image at a first time point to a thermal image at a second time point.

* * * * *